United States Patent [19]

Glassman et al.

[11] 4,323,430
[45] Apr. 6, 1982

[54] PROCESS FOR SEPARATING AMMONIA AND ACID GASES FROM STREAMS CONTAINING FIXED AMMONIA SALTS

[75] Inventors: Donald Glassman, Mt. Lebanon Township, Allegheny County; Edward E. Maier, Murrysville, both of Pa.

[73] Assignee: United States Steel Corporation, Pittsburgh, Pa.

[21] Appl. No.: 244,489

[22] Filed: Mar. 16, 1981

[51] Int. Cl.³ .......................... B01D 3/38; C02F 1/04
[52] U.S. Cl. ........................................ 203/7; 203/11; 203/22; 203/25; 203/36; 203/37; 203/78; 203/79; 203/80; 203/86; 203/87; 423/357
[58] Field of Search ............. 203/7, 22, 10, 11, 23–27, 203/33, 36, 37, 71, 73, 78–80, 91–97, 86, 87; 202/154, 180; 423/356, 357

[56] References Cited

U.S. PATENT DOCUMENTS

| | | | |
|---|---|---|---|
| 1,566,795 | 12/1925 | Hefner et al. | 203/36 |
| 1,878,979 | 9/1932 | Tiddy | 423/357 |
| 2,263,688 | 11/1941 | Allen et al. | 422/189 |
| 3,278,423 | 10/1966 | Millar | 203/36 |
| 3,989,459 | 11/1976 | Nose et al. | 203/7 |
| 4,104,131 | 8/1978 | Didycz et al. | 203/7 |
| 4,111,759 | 9/1978 | Didycz et al. | 203/7 |
| 4,260,462 | 4/1981 | Didycz et al. | 203/36 |

OTHER PUBLICATIONS

Patent Application U.S. Ser. No. 633,522; William J. Didycz et al, "A Process for Separating Acid Gases and Ammonia From Dilute Aqueous Solutions Thereof", Filed Nov. 19, 1975.

Primary Examiner—Wilbur L. Bascomb, Jr.
Attorney, Agent, or Firm—W. Gary Goodson

[57] ABSTRACT

A process for the substantially complete removal of acid gases and ammonia from aqueous solutions is disclosed, which comprises a two stage distillation operation wherein the pressure in the first distillation stage is substantially less than the pressure in the second stage, the ammonia concentration in this stage decreases downwardly so that an aqueous bottoms stream has a pH less than 8, this aqueous bottoms stream is treated with alkali and then distilled in the second stage. A portion of the aqueous bottoms can be vaporized by indirect heat exchange with vapors evolving from the second stage. The improvement lies in adding ammonia to the overhead vapor from the first stage to reduce corrosion of the condenser and preferably, the amount of vapor condensed is controlled to further minimize corrosion.

34 Claims, 2 Drawing Figures

PROCESS FOR SEPARATING AMMONIA AND ACID GASES FROM STREAMS CONTAINING FIXED AMMONIA SALTS

BACKGROUND OF THE INVENTION

In recent years improvements have been made in the free and fixed ammonia still system for treating waste streams from coal conversion facilities to remove ammonia and acid gases from these streams. In the past it was common to pass the vapor stream containing ammonia from the top of the second distillation (fixed still) through the bottom of the first distillation (free still) as a means of conserving energy by using the heat from this vapor stream to heat the liquids in the first distillation. However, it was found that improved performance can be achieved by using an indirect heat exchanger to transfer the heat from the second distillation vapors to the first distillation liquids. This results in a bottom liquid from the first distillation having a lower pH, less than about 8.0, than would result when the heat transfer takes place by direct contact. This lower pH in turn results in improved removal of acid gases from the waste stream being treated in the first distillation. This improved removal of acid gases also results in a purer ammonia vapor stream leaving the top of the second distillation.

One problem that has arisen with this improved ammonia removal system is that the condenser used to concentrate the ammonia in the vapor stream from the first distillation can suffer from serious corrosion problems if relatively high ratios of acid gases to ammonia occur in the feed water. This causes poor performance of the process and increases shutdown time and capitol costs due to more frequent replacement of the condenser as compared to the older system, or the need to employ more expensive materials of construction in the condenser and associated equipment.

SUMMARY OF THE INVENTION

It has now been found that in the process comprising: (a) subjecting the solution to a first counter-current multi-stage continuous distillation, the distillation being conducted by heating the solution, at least in part by means of a stripping vapor, and by having a gradient of ammonia concentration decreasing towards the region of bottom liquid withdrawal which results in the bottom liquid having a pH of less than about 8.0, (i) withdrawing from this first distillation an overhead vapor stream containing a major proportion of stripping vapor, substantially all of the acid gases in the solution, and substantially all of the ammonia from the free ammonia salts, (ii) withdrawing from this distillation an aqueous bottom stream which contains substantially all of the fixed ammonia salts; (b) adding alkali to the withdrawn bottom stream, the alkali being added in an amount sufficient to evolve ammonia contained in the fixed ammonia salts during subsequent distillation of the mixture; (c) subjecting the withdrawn bottom stream to a second counter-current multi-stage continuous distillation, (i) withdrawing from this second distillation an overhead vapor stream the vapor stream containing a portion of the ammonia from the fixed ammonia salts, (ii) withdrawing from this second distillation an aqueous bottom stream; (d) vaporizing the aqueous bottom stream of step (a), at least in part (1) by heating the bottom stream by means of indirect heat exchange with at least a portion of the overhead vapor stream being withdrawn in step (c) and (2) by conducting the first distillation at a pressure substantially less than the pressure of the second distillation; (e) passing the vapor stream from the first distillation through a condenser to concentrate the ammonia in the vapor stream leaving the condenser, the aforesaid condenser corrosion problem is overcome by adding ammonia to the vapor stream from the first distillation. Preferably, the amount of water vapor condensed in the condenser is adjusted to further minimize corrosion of the condenser. It is also preferred that the ammonia added to the vapor stream from the first distillation comprises the ammonia from the ammonia-containing vapor stream from the second distillation.

Corrosion rates of steel in aqueous solutions of ammonia and acid gases are known to increase with increasing concentrations of ammonia and acid gases. Adding aqueous ammonia vapor to the condenser, however, has the unexpected result of decreasing the concentrations of both ammonia and acid gases in the condensate from the condenser. Acid gas concentrations in the liquid are reduced because their concentration in the vapor from the condenser are reduced by dilution with the aqueous ammonia stream. Ammonia concentrates in the liquid are reduced because the mol ratio of acid gases to ammonia in the vapor is reduced. This reduced ratio of acid gases to ammonia causes an increase in ammonia volatility which, in turn, reduces the ammonia concentration in the condensate if the concentration of ammonia in the vapor from the condenser is kept constant.

The invention described herein also includes the apparatus for carrying out the described processes.

DESCRIPTION OF THE PREFERRED EMBODIMENTS

Figure 1:
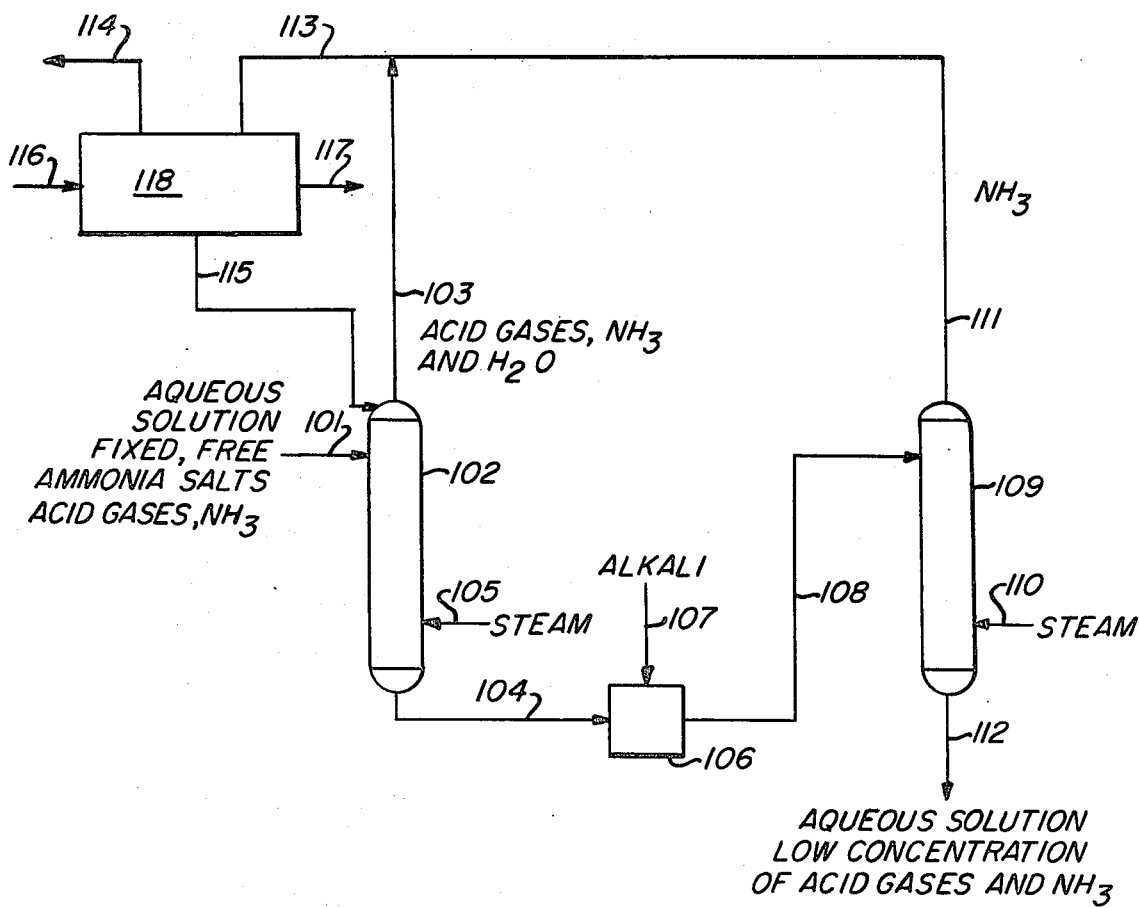
FIG. 1 is a simplified flow diagram of the improved ammonia and acid gas removal process of this invention.

The condenser used to condense the vapor stream from the first distillation is preferably made of steel, and most preferably of stainless steel. This condenser is preferably adjusted so that the amount of water vapor condensed by this condenser will minimize the corrosion of this condenser while maintaining an ammonia concentration in the uncondensed vapor high enough to facilitate subsequent recovery of ammonia from the vapor stream. This adjustment is such that most preferably the vapor stream from this condenser has a concentration of ammonia between about 5 and about 15 weight percent based upon the total weight of the vapor stream from the condenser.

In the segment of the process dealing with the dilute aqueous solution containing free and fixed ammonia salts and acid gases, the vapor stream from the second distillation is kept separate from the liquid in the first distillation. It has been found that this separation of second distillation vapors from the first distillation provides optimum conditions for removal of acid gases in the first distillation. In addition, this method of operation permits optimum conditions to be used for recovery of ammonia in the second distillation.

Generally, the dilute aqueous solutions which will be treated by this invention are those having acid gases and ammonia in the solution together with fixed and free ammonia salts. By dilute is meant solutions having water as its major component, where the total dissolved acid gases and fixed and free ammonia are up to 10 percent by weight. The acid gases include $CO_2$, HCN and $H_2S$ or mixtures thereof. Any one of these may be present by itself or in combination with one or more of the others. The simultaneous low concentration of acid gas and ammonia in the treated solutions is an important aspect of this portion of the invention. Where the acid gases include $CO_2$, the simultaneous reduction of $CO_2$ and $NH_3$ concentrations in the bottom liquid from the first distillation tends to reduce the amount of sludge produced after lime addition. Where the acid gases include HCN, the reduced concentrations of ammonia and cyanide in the exit water are very useful when activated sludge plants are subsequently used to remove biodegradable materials from the water.

The most common dilute aqueous solutions will contain $CO_2$, $H_2S$, and HCN with $NH_3$, as well as the fixed and free ammonia salts; Van Krevelan et al, Recueil 68 (1949) pp. 191–216 describes the vapor pressures of such solutions as well as the ionic species of acid gas salts and ammonium compounds in such solutions, which would be representative of the aqueous solutions upon which the invention may be practiced. Commonly, the acid gases and free and fixed ammonia comprise up to about 0.6% by weight of the aqueous solutions.

Where the solution is a waste water of streams collected from coke plants and coal conversion plants, other components may include tars, phenols, fluorides, chlorides, sulfates, thiosulfates, and thiocyanates. In these circumstances, the tars would be removed by decanting and then the ammonia and acid gases would be removed according to the subject invention.

The collected waste waters from coke or other coal conversion plants are often referred to as ammoniacal liquors. The principal free and fixed salts present in the liquors are as follows:

| Free Salts | Fixed Salts |
|---|---|
| ammonium carbonate | ammonium chloride |
| ammonium bicarbonate | ammonium thiocyanate |
| ammonium sulfide | ammonium ferrocyanide |
| ammonium cyanide | ammonium thiosulfate |
| | ammonium sulfate |

In addition to ammonia and ammonium salts, the waste waters contain low concentrations of suspended and dissolved tarry compounds. The most important of these compounds are the phenols or "tar acids", the concentration of which usually ranges from about 0.3 to about 15 grams per liter of liquor. Pyridine bases, neutral oils, and carboxylic acids are also present but in much lower concentrations.

The insoluble precipitates formed on the addition of lime to the waste water generally include calcium sulfate, calcium sulfite, calcium carbonate, calcium fluoride, calcium phosphate or mixtures of the same.

Typical compositions of liquors from various sections of the coke oven operation are:

TABLE I

Composition of Weak Ammonia Liquors From Several Coke Plants

| | Ammonia-Recovery Process | | | |
|---|---|---|---|---|
| | Semidirect | | Indirect | |
| Plant | A | B | C | D |
| Ammonia, total, gpl | 7.60 | 6.20 | 4.65 | 3.59 |
| Free, gpl | 4.20 | 4.76 | 3.37 | 2.70 |
| Fixed, gpl | 3.40 | 1.44 | 1.28 | 0.89 |
| Carbon dioxide as $CO_2$, gpl | 2.35 | 3.94 | 2.78 | 1.74 |
| Hydrogen sulfide as $H_2S$, gpl | 0.86 | 0.34 | 1.26 | 1.13 |
| Thiosulfate as $H_2S_2O_3$, gpl | 0.022 | 0.51 | | |
| Sulfite as $H_2SO_3$, gpl | 2.84 | | | |
| Sulfate as $H_2SO_4$, gpl | | 0.15 | | |
| Chloride as HCl, gpl | 6.75 | 1.85 | | |
| Cyanide as HCN, gpl | 0.062 | 0.05 | | |
| Thiocyanate as HCNS, gpl | 0.36 | 0.42 | | |
| Ferrocyanide as $(NH_4)Fe(CN)_6$, gpl | 0.014 | 0.039 | | |
| Total sulfur, gpl | 1.014 | 0.57 | | |
| Phenols as $C_6H_5OH$, gpl | 0.66 | 3.07 | | |
| Pyridine bases as $C_5H_5N$, gpl | 0.48 | 0.16 | 1.27 | 0.98 |
| Organic number, cc N/50 $KMnO_4$ per liter | | | 4856 | 3368 |

TABLE II

Typical Compositions of Flushing and Primary Cooler Liquors

| Liquor | Flushing Liquor, gpl | Primary-Cooler Condensate, gpl |
|---|---|---|
| Total ammonia | 4.20 | 6.94 |
| "Free" ammonia | 1.65 | 6.36 |
| "Fixed" ammonia | 2.55 | 0.58 |
| Total sulfur | 0.668 | |
| Sulfate as sulfur trioxide | 0.212 | |
| Sulfide as hydrogen sulfide | 0.003 | |
| Ammonium thiosulfate | 0.229 | 0.29 |
| Carbonate as carbon dioxide | 0.374 | |
| Cyanide as hydrogen cyanide | 0.002 | |
| Chloride as chlorine | 8.13 | 1.05 |
| Ammonium thiocyanate | 0.82 | |
| Phenols | 3.55 | 3.20 |

A fuller discussion of the recovery of ammonia from coke oven gases and the origin of the various ammonia salts species in the various sections of coke oven plants is given in the book, COAL, COKE AND COAL CHEMICALS, P. J. Wilson and J. H. Wells, McGraw-Hill Book Company, Inc., N.Y., 1950, particularly Chapter 10, pp. 304–325.

The following Table 3 illustrates the range of compositions in coke plant waste water that comprise aqueous solutions especially suitable for the practice of this invention:

TABLE 3

Typical Composition Ranges for Coke Plant Waste Water

| | | Typical Compositions, ppm* | | |
|---|---|---|---|---|
| Component | Composition Range ppm* | Waste Water No. 1 | Waste Water No. 2 | Waste Water No. 3 |
| Free ammonia | 450 to 10000 | 1900 | 770 | 1350 |
| Fixed ammonia | 700 to 4000 | 1900 | 1190 | 2440 |
| Cyanide | 2 to 1000 | 210 | 35 | 65 |
| Sulfide | 0 to 1300 | 500 | 1 | 10 |
| Carbonate | 150 to 4000 | 2180 | 190 | 350 |
| Chloride | 750 to 8500 | 2300 | 1920 | 4460 |
| Sulfate/Sulfite | 150 to 3000 | 310 | 325 | 415 |
| Thiosulfate | 90 to 600 | 440 | 115 | 300 |
| Thiocyanate | 100 to 1000 | 700 | 150 | 310 |
| Total sulfur | 200 to 2000 | 1300 | 250 | 550 |
| Fluoride | 30 to 150 | 60 | 40 | 75 |
| Phenols | 300** to 3600 | 1500 | 400 | 725 |

TABLE 3-continued

Typical Composition Ranges for Coke Plant Waste Water

| Component | Composition Range ppm* | Typical Compositions, ppm* | | |
|---|---|---|---|---|
| | | Waste Water No. 1 | Waste Water No. 2 | Waste Water No. 3 |
| pH | 7 to 9.1 | 9.0 | 7.5 | 7.6 |

*Parts per million by weight.
**Dephenolized coke plant waste water could contain as little as 0.1 ppm phenols.

The production of a substantially pure ammonia stream from dilute aqueous solutions such as described above can be achieved by having two successive and separate continuous distillations each operating under counter-current multistage separation conditions. In the first distillation, the process conditions are selected so that essentially all of the ammonia from the free ammonia salts are vaporized and removed from the solution. The general conditions to achieve this result are to countercurrently contact sufficient stripping vapor which is substantially free of ammonia with the inlet feed while withdrawing overhead the vapor containing acid gases and ammonia, and withdrawing a bottom stream that is essentially depleted of the free ammonia and said gases.

Because of its desirable physical properties and ready availability, the preferred stripping vapor consists essentially of streams in which minor amounts of non-condensables may be present. The hereinafter specific description of the preferred practice of this invention is made with reference to the stripping vapor being steam. It being understood that due allowance be made for variations in operating conditions where the stripping vapor contains a significant proportion of a non-steam component.

Typical conditions in the process are given below. The inlet feed temperatures may be in the range of about 60°–265° F., the overhead temperatures in the range of about 140°–265° F., and the bottom temperatures in the range of about 160°–275° F. The first distillation will be conducted at a pressure in the range of about 0.3 to 3.0 atmos. abs. The low part of the pressure range allows for efficient use of low pressure steam while the higher pressures give more efficient removal of cyanides. In this first distillation, the gradient of ammonia concentration is controlled to be decreasing towards the bottom of the column. Thus, substantially all of the free ammonia salts, e.g. sulfide, carbonate and cyanide, are decomposed into ammonia and acid gases that are removed by the stripping vapor. The decreasing ammonia concentration results in decreasing the pH which enhances the stripability of the acid gases in the lower section of the distillation tower. This results in the solution at the bottom of the column becoming mildly acid, ca. pH of about 5 to 6. The acid gases can thus be removed substantially completely from the solution with the result that the still bottoms is also very low in acid gas content. The preferred concentration of ammonia in the first distillation bottom stream is about 40 to 200 ppm. As another aspect of these conditions, if direct injection of steam is used to supply part or all of the heat required for vaporization, then this steam should be substantially free of ammonia so that the pH range in the first distillation can be maintained at less than 8, and preferably in the mildly acid range.

The ratio of internal liquid to internal vapor flow should be as high as possible to achieve good economy of operation; the L/V values may be in the range of about 10/1 to 2/1 for this first distillation.

The bottom stream from this first distillation is treated by addition of lime to increase its pH such that the bottoms stream from the second distillation column has a pH of 9.5–12 when measured at 50° C.

The lime reacts with both fixed ammonia salts and any residual acid gases. With respect to the ammonia salts, the principal reaction is with ammonium chloride although ammonium thiocyanide and sulfate also react according to the following equations:

$$2NH_4Cl + Ca(OH)_2 \rightarrow CaCl_2 + 2NH_3 + 2H_2O$$

$$2NH_4SCN + Ca(OH)_2 \rightarrow Ca(SCN)_2 + 2NH_3 + 2H_2O$$

The reactions between lime and any residual acid gases are according to the following equations:

$$CO_2 + Ca(OH)_2 \rightarrow CaCO_3 + H_2O$$

$$H_2S + Ca(OH)_2 \rightarrow CaS + 2H_2O$$

$$2HCN + Ca(OH)_2 \rightarrow Ca(CN)_2 + 2H_2O$$

The major portion of any residual acid gases is $CO_2$ and the calcium carbonate thus formed tends to consume lime and forms additional lime sludge and thus causes scaling or fouling in distillation equipment.

The treated stream is subjected to a second distillation. As noted above, the high pH and heat cause the "fixed" ammonia salts to decompose with liberation of the ammonia. The resulting overhead vapors are essentially ammonia and water. The feed temperature may be in the range of about 155°–270° F., the overhead vapors may be at a temperature in the range of about 140°–290° F., and the bottom stream may be at a temperature in the range of about 160°–295° F. The pressure may be up to about 60 psia. The bottoms stream from the second distillation will have a low concentration of total ammonia and of cyanides. The pH will be in the range of 9.5–12. The total ammonia may be as low as 25 ppm. The total cyanides, including complexed cyanides and free cyanides expressed in terms of equivalent HCN concentration [HCN(total*)], may be as low as 2 ppm; the free cyanides, cyanides amendable to chlorination, in some cases may even be less than 1 ppm. This bottom stream can be clarified and then treated to remove other organic materials, such as phenols.

By having the acid gases and free ammonia removed in the first distillation, the second distillation can be conducted for the optimum removal of ammonia from the alkaline fixed ammonia salt solution. Also, the fixed ammonia salt solution will have minimum deposits of salts that arise from the presence of the acid gases. Also, the low concentration of ammonia in the bottoms of the first distillation allows substantially complete removal of acid gases, such as hydrogen cyanide, carbon dioxide, and hydrogen sulfide from the bottom stream so that the tendency to deposit salts in the second distillation is reduced. It is another benefit of this invention that the various streams may be utilized as heat sources in the distillations to minimize the consumption of energy for achieving effluents with low concentrations of ammonia and cyanide. As well, the overheads of the first distillation may be treated to separate the ammonia and acid gases; the overheads from the second distillation are essentially water and ammonia.

It is preferred according to this invention to pass the overhead vapor stream from the second distillation through an indirect heat exchanger to heat the aqueous bottom stream from the first distillation. This eliminates the need to use fresh steam for this purpose and thereby saves energy.

The liquid and vapor from this heat exchanger can then be sent in whole or in part to the condenser for the vapor stream from the first distillation. If desired, the liquid and vapor can be separated into a vapor stream that is sent to the condenser while the liquid is returned to the second distillation. Alternatively, the vapor from the heat exchanger can be condensed and then added to the condenser.

The flow diagram of FIG. 1 shows an aqueous solution containing free and fixed ammonia salts, acid gases and ammonia through line 101 into first distillation column 102. In this column, the solution is heated and its pH values are in a range to increase the volatility of acid gases. In the distillation of a multi-component liquid, the upflowing vapor which becomes enriched with the more volatile components of liquid is described as having a stripping action on the liquid. Hence, this vapor is termed a stripping vapor. The stripping vapor may be a condensable gas or a non-condensable gas or a combination of these; e.g. steam, air, hydrogen, nitrogen and methane. The stripping vapor may be generated by vaporization of the liquid, or by injecting vapor into the distillation or by a combination of these. Because this invention concerns distillation of dilute aqueous streams, the stripping vapor will generally comprise a predominant proportion of steam. The overhead vapor leaving the column by line 103 will have a major proportion of the stripping vapor, such as steam, substantially all of the acid gases and free ammonia. Heat for the first column can be provided by direct injection of steam or other stripping medium or by indirect heat exchange or a combination of these; as shown, steam is directly injected into the column by line 105. From the first column, a bottom liquid is withdrawn by line 104 and mixed with alkali, such as lime from line 107, in the chamber 106. Grit and other readily separable solids, such as precipitates, can be removed from this chamber 106. This bottom liquid stream flows by line 108 to a second distillation column 109. In this column, the liquid is heated and an overhead vapor stream of ammonia and water substantially free of acid gases is removed by line 111. The conditions of this second column are selected for maximum recovery of ammonia. This column can be heated by direct injection of stripping vapor such as steam or by other art-recognized methods, or by combinations of these; as shown, steam is injected by line 110. An aqueous bottom stream which is a solution of low-concentration of acid gases and ammonia is removed through line 112. This aqueous bottom stream is now suitable for further processing, such as by biological oxidation to further remove toxic substances so that the bottom stream can be discharged into rivers, reused, etc. The overhead vapor stream from the second distillation column 109 which leaves the column by line 111 is combined with vapors from the first distillation in line 103. The combined vapor flows by line 113 to a condenser 118 where the vapor is partially condensed, generating a vapor stream and a liquid stream. The liquid stream is returned to the first distillation column 102 by line 115 which the vapor stream flows from the condenser by line 114. Cooling water to provide heat removal in the condenser 118 enters through line 116 and leaves through line 117.

Figure 2:
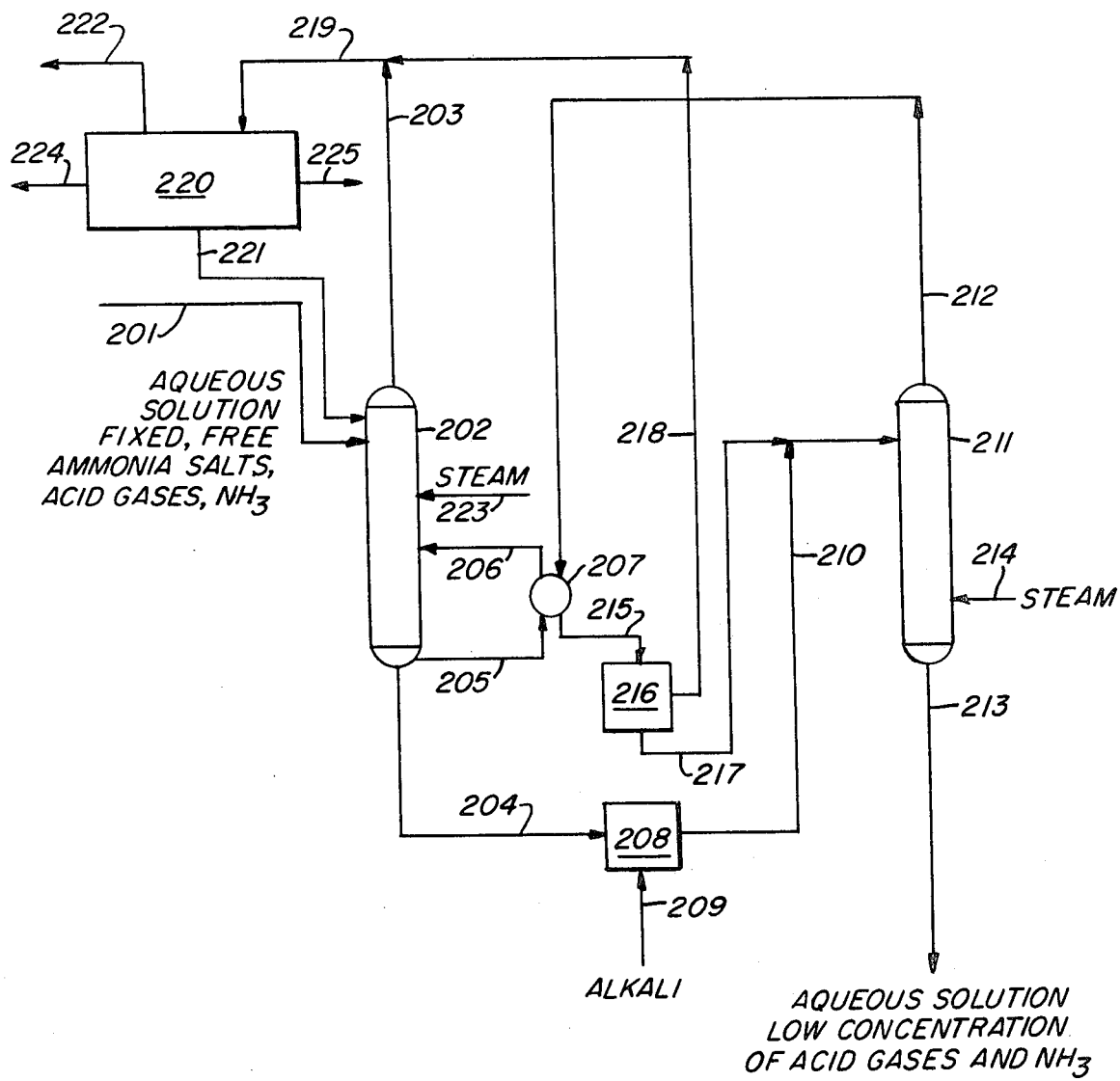
FIG. 2 is a flow diagram which illustrates the preferred embodiment of the invention.

The flow diagram of FIG. 2 shows the preferred method by which the invention may be used. An aqueous solution containing free and fixed ammonia salts, acid gases and ammonia flows through line 201 into first distillation column 202. In this column, the solution is heated and its pH values are in a range to increase the volatility of acid gases. Stripping vapor is introduced into the distillation column 202 by a combination of two methods. First, bottoms liquid may be withdrawn from the column through line 205 and then flow to a reboiler 207 where the liquid is partially vaporized. The partially vaporized liquid is returned to the distillation column 202 through line 206. Second, supplemental stripping vapor such as steam may also be added through line 223. The overhead vapor leaving the column by line 203 will have a major proportion of the stripping vapor, and substantially all of the acid gases and free ammonia. From the first column, a bottom liquid is withdrawn by line 204 and mixed with alkali, such as lime by line 209, in the chamber 208. Grit and other readily separable solids, such as precipitates, can be removed from this chamber 208. This bottom liquid stream flows by line 210 to a second distillation column 211. In this column, the liquid is heated and an overhead vapor stream of ammonia and water substantially free of acid gases is removed by line 212. The conditions of this second column are selected for maximum recovery of ammonia. This column can be heated by direct injection of stripping vapor such as steam or by other art-recognized methods, or by combinations of these; as shown, steam is injected by line 214. An aqueous bottom stream which is a solution of low-concentration of acid gases and ammonia is removed through line 213. This aqueous bottom stream is now suitable for further processing, such as by biological oxidation to further remove toxic substances so that the bottom stream can be discharged into rivers, reused, etc. The overhead vapor stream from the second distillation column 211 which leaves the column by line 212, flows to the reboiler 207, where the vapor stream is partially condensed. The partially condensed vapor stream leaves the reboiler by line 215 and flows to a separator 216 where the liquid and vapor portions of the stream are separated. The separated liquid flows from the liquid separator by line 217, is combined with feed to the second distillation in line 210, and enters the second distillation column 211 with stream 210. The vapor stream leaves the separator 216 and flows by line 218 to line 203 where it is combined with vapors from the first distillation. The combined vapor flows by line 219 to a condenser 220 where the vapor is partially condensed, generating a vapor stream and a liquid stream. The liquid stream is returned to the first distillation column 202 by line 221 while the vapor stream flows from the condenser by line 222. Cooling water to provide heat removal in the condenser 220 enters through line 224 and leaves through line 225. The materials of condenser 220 are protected from corrosion by the effect of the ammonia from the second distillation column which is added to the condenser in the form of vapor from separator 216 through lines 218 and 219.

We claim:
1. In a process for achieving substantially complete removal of acid gases and ammonia from a dilute aqueous solution thereof, said solution also containing free and fixed ammonia salts, said process comprising:

(a) subjecting said solution to a first countercurrent multi-stage continuous distillation, said distillation being conducted by heating said solution, at least in part by means of a stripping vapor, and by having a gradient of ammonia concentration decreasing towards the region of bottom liquid withdrawal which results in said bottom liquid having a pH of less than about 8.0,
   (i) withdrawing from this first distillation an overhead vapor stream containing a major proportion of stripping vapor, substantially all of said acid gases in said solution, and substantially all of the ammonia from said free ammonia salts,
   (ii) withdrawing from this distillation an aqueous bottom stream which contains substantially all of said fixed ammonia salts;
(b) adding alkali to said withdrawn bottom stream, said alkali being added in an amount sufficient to evolve ammonia contained in said fixed ammonia salts during subsequent distillation of said mixture;
(c) subjecting said withdrawn bottom stream to a second counter-current multi-stage continuous distillation,
   (i) withdrawing from this second distillation an overhead vapor stream said vapor stream containing a portion of the ammonia from said fixed ammonia salts,
   (ii) withdrawing from this second distillation an aqueous bottom stream;
(d) vaporizing the aqueous bottom stream of step (a), at least in part (1) by heating said bottom stream by means of indirect heat exchange with at least a portion of the overhead vapor stream being withdrawn in step (c) and (2) by conducting said first distillation at a pressure substantially less than the pressure of the second distillation;
(e) passing said vapor stream from said first distillation through a condenser to concentrate the ammonia in the vapor stream leaving the condenser, the improvement comprising adding ammonia to said vapor stream from said first distillation to reduce corrosion of said condenser.

2. Process as in claim 1 wherein the amount of water vapor condensed in said condenser is adjusted to further minimize corrosion of said condenser.

3. Process as in claim 1 wherein the ammonia added to said vapor stream from said first distillation comprises said ammonia from said ammonia-containing vapor stream from said second distillation.

4. Process as in claim 2 wherein said condenser is made of steel and wherein said condenser is adjusted to produce a vapor stream from the condenser having a concentration of ammonia between about 5 and about 15 weight percent based upon the total weight of the vapor stream from the condenser.

5. Process as in claim 1 wherein said dilute aqueous solution is derived from a coal conversion process.

6. Process as in claim 5 wherein said coal conversion process is a coke production process.

7. Process as in claim 1 wherein said indirect heat exchange includes the condensation of the overhead vapors from step (c) into a liquid fraction and a vapor fraction.

8. Process as in claim 7 wherein said liquid fraction is returned to step (c) as reflux for said second distillation.

9. Process as in claim 7 wherein the ammonia added to said vapor stream from said first distillation comprises the ammonia from said vapor fraction from step (c).

10. A process for achieving substantially complete removal of acid gases and ammonia from a dilute aqueous solution thereof, said solution also containing free and fixed ammonia salts, said process comprising:
(a) subjecting said solution to a first counter-current multi-stage continuous distillation, said distillation being conducted by heating said solution, at least in part by means of a stripping vapor, and by having a gradient of ammonia concentration decreasing towards the region of bottom liquid withdrawal which results in said bottom liquid being in the acid range and wherein said distillation is conducted at a pressure in the range of about 0.3 to about 3 atmospheres absolute,
   (i) withdrawing from this first distillation an overhead vapor stream containing a major proportion of stripping vapor comprising steam having a temperature in the range of about 140° to 265° F., substantially all of said acid gases in said solution and substantially all of the ammonia from said free ammonia salts,
   (ii) withdrawing from this first distillation an aqueous bottom stream which contains substantially all of said fixed ammonia salts and has a temperature in the range of about 160° to about 275° F.;
(b) adding alkali to said withdrawn bottom stream and cooling said bottom stream to a temperature in the range of about 155° to about 270° F., said alkali being added in an amount sufficient to evolve ammonia contained in the fixed ammonia salts during subsequent distillation of said mixture;
(c) subjecting said withdrawn bottom stream to a second, counter-current multi-stage continuous distillation,
   (i) withdrawing from this second distillation an overhead vapor stream having a temperature in the range of about 140° to about 295° F., said vapor stream comprising steam and a portion of the ammonia from the fixed ammonia salts,
   (ii) withdrawing from this second distillation an aqueous bottom stream, said bottom stream being substantially free of acid gases and ammonia, and having a temperature in the range of about 160° to 315° F.;
(d) vaporizing at least a portion of the aqueous bottom stream of step (a) to form a stripping vapor for use in step (a) by indirect heat exchange with at least a portion of the streams being withdrawn in step (c) to thereby achieve substantially complete removal of the free ammonia and acid gases from the liquid that is to be treated in the second distillation of step (c), and wherein the ratio of solution flow to vapor flow within the columns is in the range of about 10/1 to 2/1 and wherein the first distillation is conducted at a pressure sufficiently less than the pressure of the second distillation to permit the overhead vapors of step (c) to provide sufficient heat by indirect heat exchange to vaporize the aqueous bottom stream of step (a);
(e) combining at least part of said ammonia from said ammonia containing vapor stream from said second distillation with said vapor stream from said second distillation; and
(f) passing the combined stream from step (e) through a steel condenser, and wherein the amount of ammonia added in step (e) and said condenser is adjusted to produce a condensed liquid having a concentration of ammonia and acid gases which is substantially non-corrosive to said condenser.

11. Process as in claim 10 wherein said steel condenser is a stainless steel condenser.

12. Process as in claim 10 wherein said indirect heat exchange is by condensation of the overhead vapors from step (c) into a liquid fraction and a vapor fraction.

13. Process as in claim 12 wherein said liquid fraction is returned to step (c) as reflux for said second distillation.

14. Process as in claim 10 including an initial step of heating said aqueous solution by indirect heat exchange with at least a part of the heat contained in the overhead vapors from step (a) so that said solution has a temperature in the range of about 60° to 212° F.

15. Process as in claim 10 wherein said acid gases include at least one member selected from the group consisting of $CO_2$, $SO_2$, $H_2S$ and HCN.

16. Process as in claim 15 wherein said member is HCN.

17. Process as in claim 10 wherein said aqueous solution includes a flushing liquor.

18. Process as in claim 10 wherein said aqueous solution is an effluent collected from the processing of coke-oven gas.

19. Process as in claim 10 wherein the said aqueous bottom stream from step (c) is subjected to biological degradation to reduce the content of toxic substances in said bottom water stream.

20. Process as in claim 10 wherein said overhead vapor stream withdrawn in step (a) comprises about 90 percent steam.

21. Process as in claim 10 wherein a portion of the heat required to step (a) is supplied by (i) direct injection of a stream comprising steam or (ii) indirect heat exchange with the liquids in step (a) or (iii) a combination of (i) and (ii).

22. Process as in claim 10 including the additional step of removing readily separable solids prior to adding said alkali to said withdrawn bottoms stream in step (b).

23. Process as in claim 10 wherein at least a portion of the heat required in the distillation of step (c) is supplied by direct injection of a stream comprising steam.

24. Process as in claim 10 wherein said acid gases and said free and fixed ammonia comprise up to 10 percent by weight of said aqueous solution.

25. Process as in claim 10 wherein said aqueous solution also contains tars, phenols, fluorides, chlorides, sulfates, thiosulfates, and thiocyanates, and includes the preliminary step of removing the tars prior to step (a).

26. Process as in claim 25 wherein said tars are in a concentration of from about 0.3 to about 15 grams per liter of solution.

27. Process as in claim 10 wherein said free ammonia is present in the range of about 50 to 50,000 parts per million.

28. Process as in claim 10 wherein said fixed ammonia is present in the range of about 50 to 50,000 parts per million.

29. Process as in claim 10 wherein said aqueous bottom stream in step (a) has a pH range of about 5 to about 6 when measured at 50° C.

30. Process as in claim 10 wherein said aqueous bottom stream in step (a) has a concentration of free ammonia of about 40 to about 200 parts per million.

31. Process as in claim 10 wherein step (c) is conducted at a pressure of up to about 60 psia.

32. Process as in claim 10 wherein said alkali added in step (b) is from the group of calcium hydroxide, sodium hydroxide, or potassium hydroxide.

33. Process as in claim 32 wherein said alkali added in step (b) is calcium hydroxide.

34. Process as in claim 33 wherein said alkali is sodium hydroxide.

* * * * *